March 11, 1924.
O. R. TURNER
1,486,400
TRIANGLE CALCULATING INSTRUMENT
Filed April 18, 1922    5 Sheets-Sheet 1
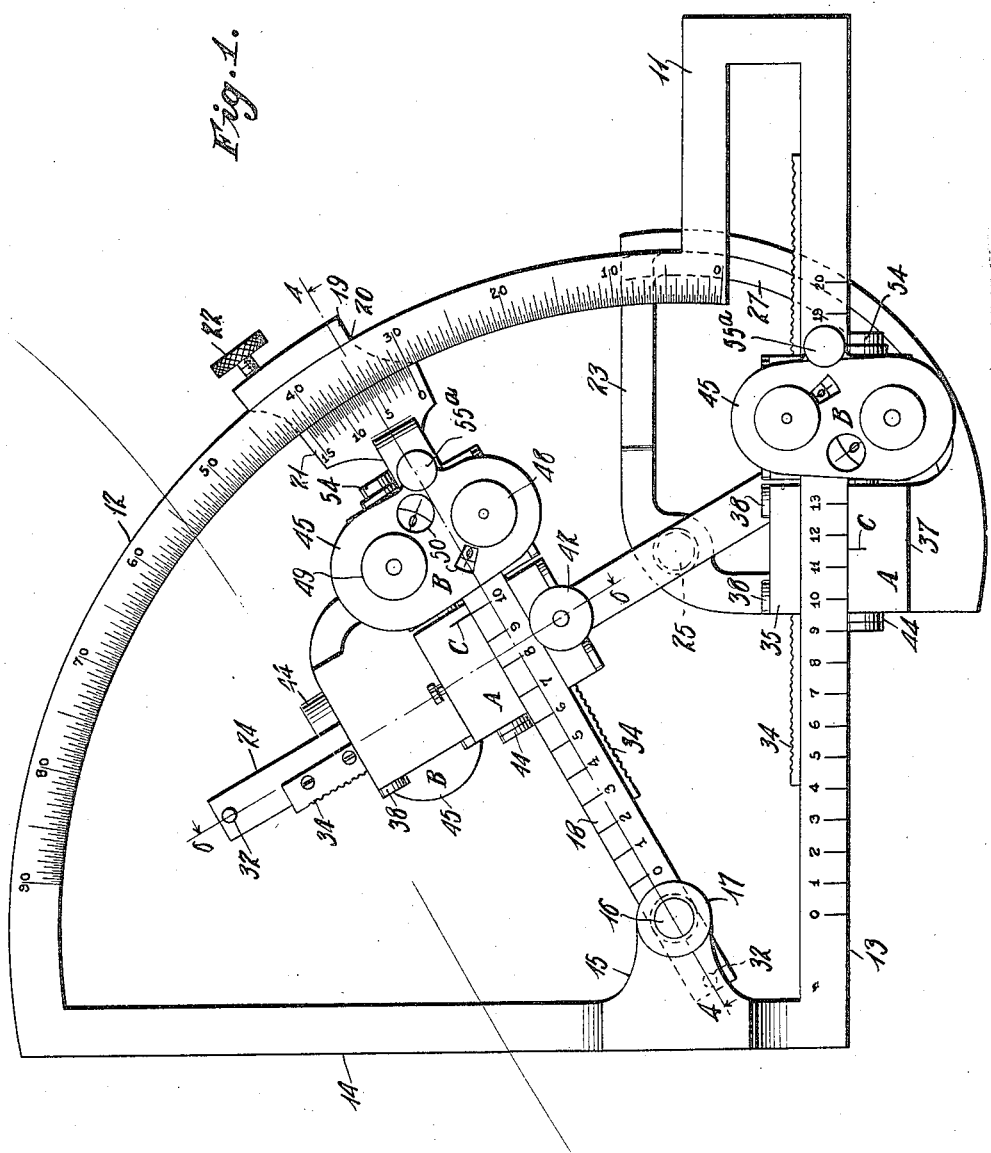
Inventor
Oscar R. Turner

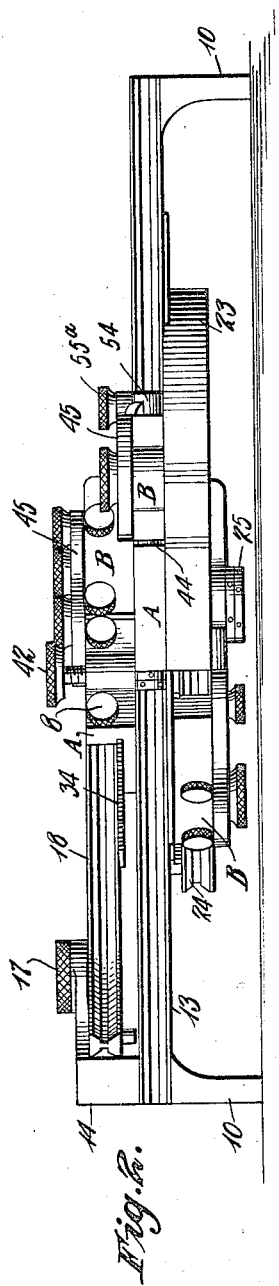

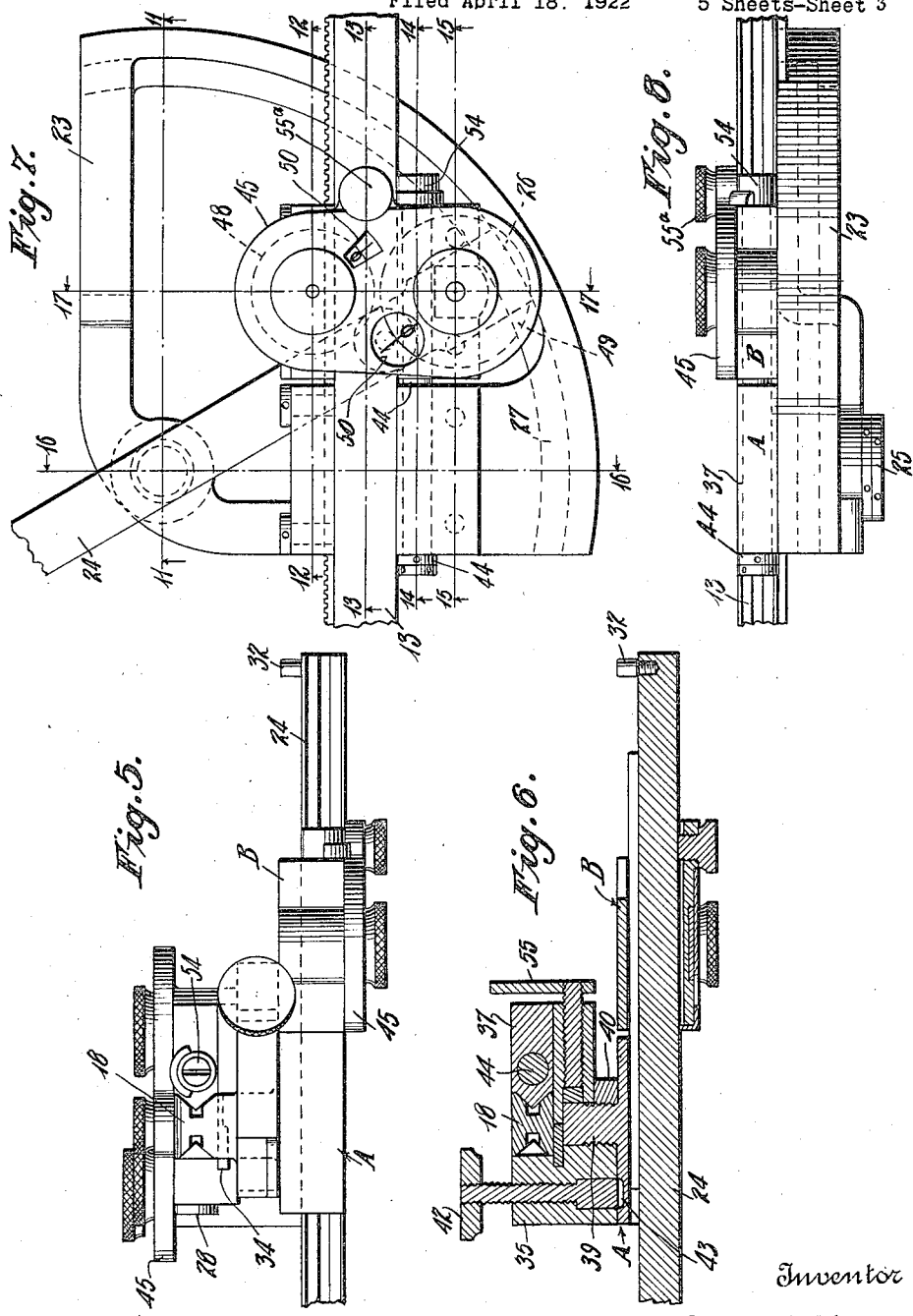

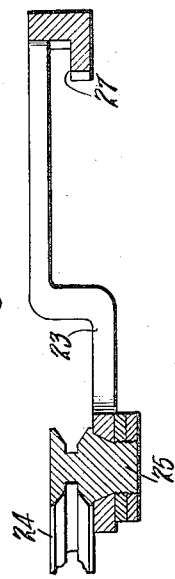
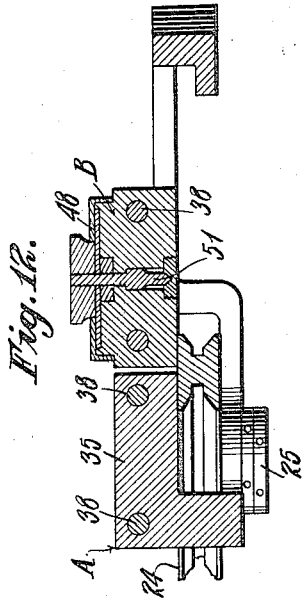
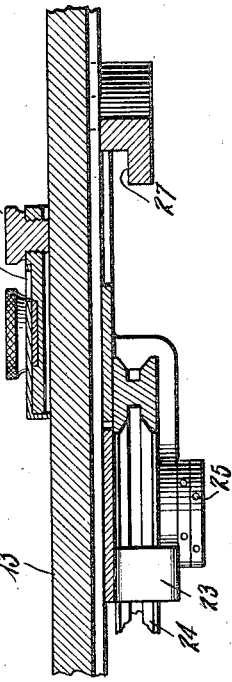
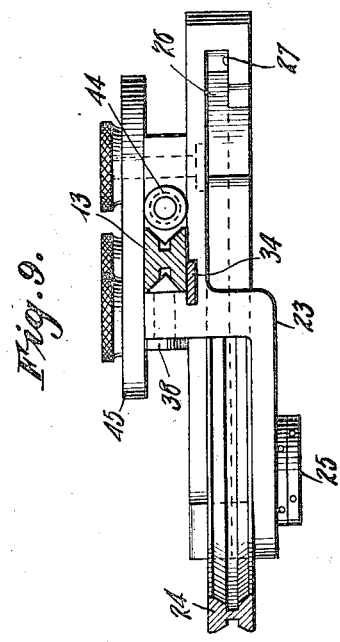
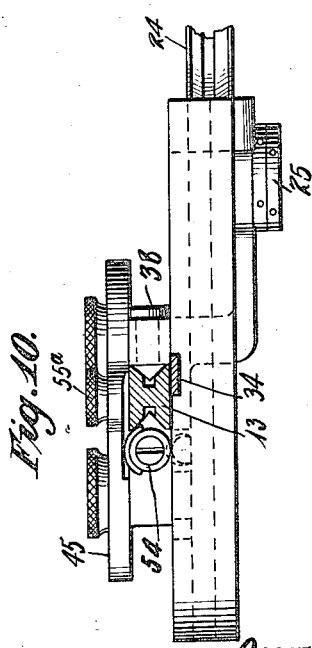

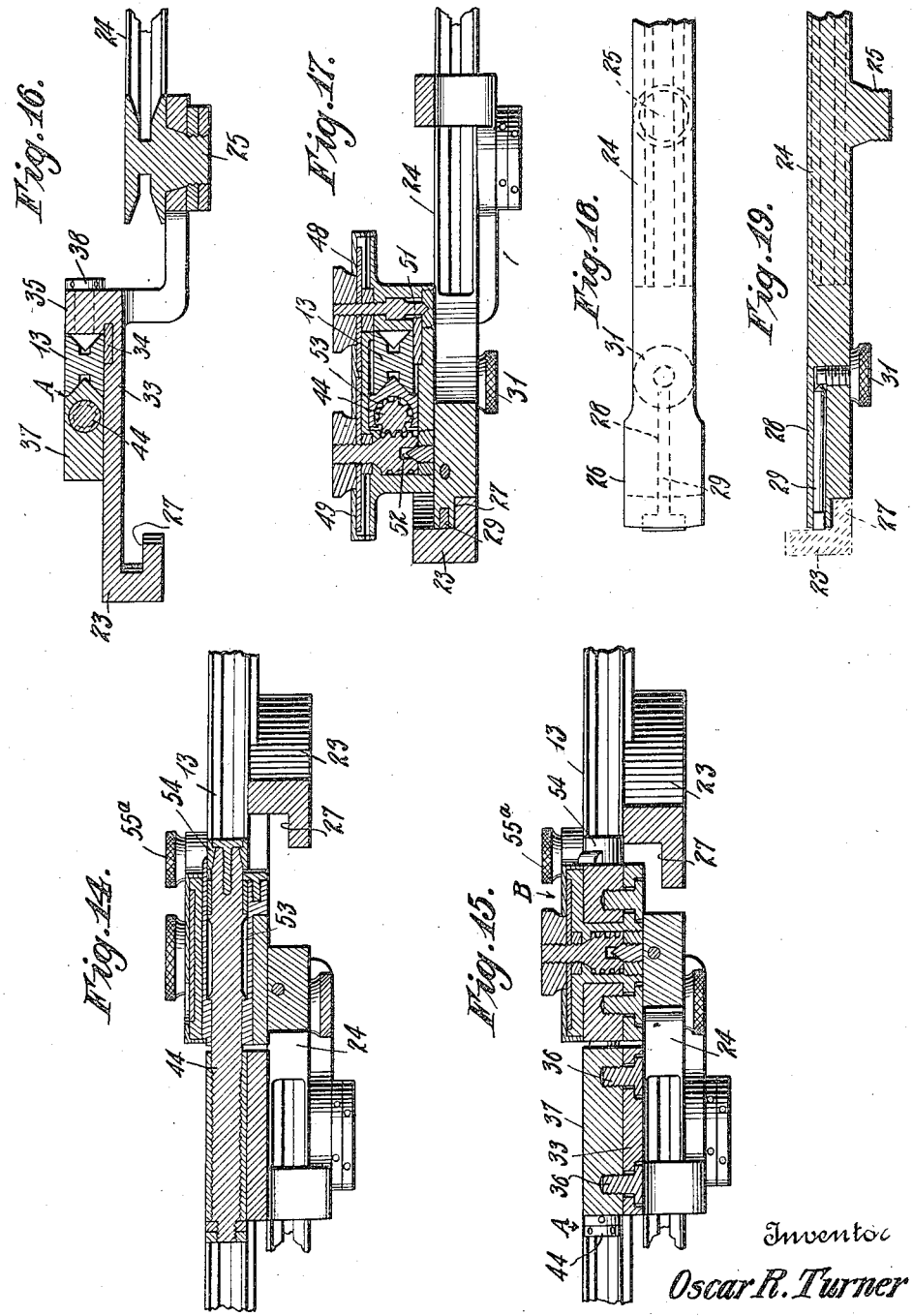

Patented Mar. 11, 1924.

1,486,400

UNITED STATES PATENT OFFICE.

OSCAR R. TURNER, OF SALT LAKE CITY, UTAH.

TRIANGLE-CALCULATING INSTRUMENT.

Application filed April 18, 1922. Serial No. 554,502.

*To all whom it may concern:*

Be it known that I, OSCAR RUSSELL TURNER, a citizen of the United States, residing at Salt Lake City, in the county of Salt Lake and State of Utah, have invented certain new and useful Improvements in Triangle-Calculating Instruments, of which the following is a specification.

This invention has reference to a triangle calculating and solving instrument.

An important object of the invention is to provide certain improvements on a triangle calculating instrument whereby the weight and the more or less complicated features of such devices is largely reduced to provide a simple, efficient instrument capable of being conveniently handled by surveyors when in the field.

An additional object is to provide an instrument of the character above described in which the slides are divided into separable parts relatively connected for adjustment along short lengths of screw associated with the slide, thus eliminating considerable waste and expense in the manufacture of the instrument.

Various other objects and advantages of the invention will become apparent as the description proceeds.

In the drawings:

Figure 1 is a plan view of the proposed instrument.

Figure 2 is a front elevation thereof.

Figure 3 is an enlarged detail view, partly in section of the guide arms of the device.

Figure 4 is a vertical longitudinal section thru the instrument as taken on line 4—4 of Figure 1.

Figure 5 is an elevational detailed view of the guides and associated mechanism of the instrument as viewed from the right of Figure 1.

Figure 6 is a longitudinal sectional view taken on line 6—6 of Figure 1.

Figure 7 is an enlarged detailed view of the lower right hand end of the instrument shown in Figure 1.

Figure 8 is a front elevation thereof.

Figure 9 is an elevation thereof as seen from the left of Figure 7, and

Figure 10 is an elevation thereof as seen from the right of Figure 7.

Figures 11 to 17 inclusive are detail sections thereof taken respectively along the lines indicated in Figure 7.

Figure 18 is a plan view of the rear end of one of guides of the instrument showing a locking device carried thereby, and Figure 19 is a central longitudinal section therethru.

The base of the instrument is in the form of a quadrant supported upon integral lugs 10 and having an offset 11 between one terminal of the arc 12 and the adjacent quadrant arm 13. Integral with the other arm 14 of the quadrant is a bracket 15 to which is pivoted, as by a lug 16 and nut 17, a guide 18. This guide has an extension 19 at its outer end which is grooved at 20 to receive arc 12 along which it is adjustable. Arc 12 is graduated to ninety degrees of a circle and a vernier 21 is carried by the guide for reading the graduations. The locking screw 22 provides means for locking the guide in any position to which adjusted.

Slidably mounted on arm 13 is a graduated sector 23 which carries a guide 24. This guide is pivoted to the sector at 25 and co-operates with guide 18 in forming a triangle. The inner end of guide 24 has a tongue 26 graduated as a vernier which engages over shoulder 27 of the sector, as seen in Figures 7 and 19. This end of the guide has a bore 28 enlarged at the mouth to receive the headed end of the pin 29 which is lodged in the bore. The action of screw 31 against the conical inner end of pin 29' serves, when desired, as a clamp to lock arm 24 to sector 23. At the outer ends of both guides suitable stop lugs 32 are placed to limit the outward adjustment of the slides carried by each guide.

Arm 13 of the quadrant, as well as both guide elements 18 and 24, has a slide which is divided into two parts, A and B respectively, both of which move along their guide-element. Since these slides are similarly constructed a description of one will suffice for all. Slide part A comprises a guide-straddling portion 33 which is grooved to receive the rack 34 of the guide and a laterally projecting portion 35 which is extended crosswise of one of the guides. Secured to portion 33, as by screws 36, is a guide-clamping block 37 which is pointed to engage in a V-groove in the adjacent side of the guide. The opposite side of the guide has a similar groove for receiving the pointed head of bearing screws 38 which are adjustable thru portion 35 for eliminating lost motion due to wear between slide-part and guide.

Slide part A of arm 13, it will be noted is an integral part of sector 23, while the slide part A of guide 24 is pivotally connected to the corresponding slide part of guide 18 by means of an integral stud 39 as shown in Figure 4, suitable spacing blocks 40 being clamped between the two parts by suitable pins 41. Suitable means are provided for locking the guides at this pivot when so desired, which means consists of a screw 55 adjustable thru the slide part of one guide. Clamp screw 42 seats in a recess or socket 43 in the slide part of the other guide when the angle between arms 18 and 24 is 90°.

Slide parts A and B are connected by a short screw 44 which extends entirely thru each slide part. In the present instance screw 44 may be considered as having forty threads per inch so that by turning the screw the space between the slide-parts may vary between the limits of 0 and 1/40 of an inch—in other words, the maximum space between slide parts may be 0 or a distance equivalent to the pitch of whatever screw is used. This screw is used in connection with lines graduated upon the guide element and representing ten threads of the screw.

Slide part B comprises a dial casing 45 having aprons 46 overhanging the sides of the guide element along which it moves, and screws 47 forming an adjustable sliding bearing similar to screw 38 of part A. Casing 45 encloses dial 48 and 49 respectively, which have their graduations visible thru openings 50 in the casing. Dial 48 is operated from rack 34 by means of a pinion 51 and the gearing is such that the pinion, and hence dial 48, will rotate ten times in traversing two and one-half inches of the guide. The dial is graduated into ten equal parts and each number on the dial represents one thread of screw 44. Dial 49 is geared to screw 44 by a worm 52 attached to the dial and meshing with gear teeth 53 on the screw in such manner that one revolution of dial 49 will cause screw 44 to rotate one tenth of a revolution as seen on dial 54 attached to one end of screw 44. Motion of the two slide parts may be prevented, when so desired, by a clamp 55 and a thumb screw 55a is used to clamp the slide against motion with respect to the guide.

In operating the instrument it is to be assumed that a single thread of screw 44 represents 1000 feet and that line C on each slide-part A is opposite to 0 mark graduated on its guide, in which position of the parts the dials of the various slides should register opposite the indicators. In solving a triangle, it is merely necessary to adjust the guides to form the triangle to be solved and to move the slide outwardly on the guide until the dials give the correct reading of the sides of the triangle. For example, suppose it is desired to set the number 74326. As a slide is moved outward along the guide, the indicator C will pass successive numbers graduated on the guide and by continuing this movement until the indicator has passed number 7 of the guide which indicates that seventy threads of screw 44 have been passed over, giving a reading in feet of seventy thousand. During this movement of the slide dial 48 has been rotating, by reason of its connection with the rack of the guide and when number 4 of the dial comes opposite the indicator it gives a reading of four thousand feet, since the dial number represents single threads of screw 44 each which have a value, in the present scale, of 100 feet. Slide part B is now clamped in place and screw 44 is rotated by the thumb nut attached to dial 49 until the indicator is opposite or between dial numbers 3 and 4 on dial 44A, giving a reading of over 300 since each revolution of dial 49 is equivalent to 1/10 of a revolution of screw 44, or 100 feet. The fraction over 33 is indicated by continuing the revolution of dial 49 until the number 26 appears opposite the indicator of dial 54. The given number 74326 is thus set upon the arm of the instrument representing the given side of the triangle and if it be required, in solving a given triangle, to read a number which is set by other means the operation would merely be that of rotating dial 54 until a number on dial 49 comes exactly opposite the indicator on the dial and then reading the number shown on the various graduations. The angle graduations, and the dials and graduations in connection with arm 24 are seen by turning the instrument over.

Although the dials and graduations are herein described in reference to a decimal system of numbers it is to be understood that the device is applicable to any desired system and may be readily adapted to suit requirements. For instance, to obtain calculations in feet and inches and fractions thereof it would only be necessary to change the ratio of the worm and the gear of the screw with a corresponding change in the graduations of the dials. The construction of the invention is simplified so as to be capable of being manufactured economically and having practically no parts which would render the operation of the machine inaccurate should they become clogged with dirt or subject to such abuse as a field machine of this character would naturally fall heir to.

From the foregoing it is believd that the advantages and novel features of the invention can be readily understood and that further detailed description is unnecessary.

What is claimed is:

1. A triangle calculating device comprising a series of guide arms relatively pivoted and adjustable to reproduce a given triangle, means for indicating the angles to which the arms are adjusted, a two-part measuring slide geared to each arm for longitudinal adjustment thereon, and an adjusting screw connecting the parts of each slide for increasing or decreasing the space between them within predetermined limits corresponding to the pitch of the screw used, the said guide arms having graduations representing a predetermined number of threads of the said screw.

2. A triangle calculating device comprising a series of pivoted guide arms relatively adjustable to reproduce a given triangle, means for indicating the angles to which the arms are adjusted, a two-part slide constrained to move along each arm, an adjusting screw connecting the parts of the slide and rotatable for varying the space between them, said arms being provided with graduations representing a predetermined number of threads of the said screw and means carried by each slide for indicating linear measurements along the arm, said means being geared in proper ratio to the guide arm so as to be actuated by the adjustments of the said arms.

3. A triangle solving device comprising a plurality of relatively adjustable members capable of being set to form the sides of a given triangle, a rack carried by each member and having teeth representing predetermined units of measurements, a slide part movable along each member and having an indicator for indicating graduations on the said member, a second slide-part having graduated dials, a screw connecting the two slide-parts for relatively adjusting the same along the member for varying the space between the parts, the graduations on the said arm respectively representing a predetermined number of threads of the said screw, means for gearing the dial of the said slide part to the rack of the member and to the said adjusting screw, respectively, whereby the said dial will be actuated by the adjustment of the said arm for indicating the length of the arms or sides of the triangle represented thereby.

4. A triangle solving device comprising a plurality of pivoted guides relatively adjustable to reproduce a given triangle, a rack carried by each guide, a slide associated with each guide and divided into two parts, a short screw connecting the said slide parts both of which are constrained to move along the guide said guide being provided with graduations representing ten threads of the screw, a pivot connection between the corresponding slide-parts of two of the said guides, separate dials carried by the other part of each slide, a pinion attached to one of the dials and engaging the rack of the guide for rotation thereby when the slide is moved in relation to the guide, means connecting another of the dials to the said screw whereby any movement of the said dial will be accompanied by a change in the distance between the two slide parts between 0 and a predetermined maximum limit, and a third dial carried by the said screw and read in connection with the dial which is geared to that screw.

5. A triangle solving instrument comprising a quadrant base having the arc thereof and one arm graduated, a graduated guide arm pivoted to the other arm of the quadrant, a sector slidable on the said graduated arm, a guide arm pivoted to the sector and co-operating with the first mentioned guide arm to reproduce a given triangle, means for indicating the angles at which the arms are set, an adjustable indicating slide-part on each guide arm for indicating the graduations thereof, a dial bearing slide-part associated with each indicating slide part, and adjusting screw connecting the two slide-parts and rotatable to vary the space between the parts, and an operative connection between each guide and the slide parts whereby the latter will be automatically operated by the adjustment of the said guide for indicating linear measurements of the sides of the triangle represented by the guides, each of the said graduations of the latter representing a predetermined number of the threads of the adjusting screw, and means gearing the screw in correct ratio with one of the dials of the slide-parts.

In testimony whereof I affix my signature.

OSCAR R. TURNER.